(12) United States Patent
Lünnemann et al.

(10) Patent No.: US 10,936,273 B2
(45) Date of Patent: Mar. 2, 2021

(54) METHOD AND APPARATUS FOR DISPLAYING A DISPLAY ELEMENT

(71) Applicant: VOLKSWAGEN AG, Wolfsburg (DE)

(72) Inventors: Patrick Lünnemann, Berlin (DE); Christopher Seubert, Berlin (DE)

(73) Assignee: VOLKSWAGEN AG, Wolfsburg (DE)

( * ) Notice: Subject to any disclaimer, the term of this patent is extended or adjusted under 35 U.S.C. 154(b) by 659 days.

(21) Appl. No.: 15/030,022

(22) PCT Filed: Oct. 2, 2014

(86) PCT No.: PCT/EP2014/071166
§ 371 (c)(1),
(2) Date: Apr. 15, 2016

(87) PCT Pub. No.: WO2015/055440
PCT Pub. Date: Apr. 23, 2015

(65) Prior Publication Data
US 2016/0246561 A1    Aug. 25, 2016

(30) Foreign Application Priority Data

Oct. 17, 2013 (DE) .................. 10 2013 221 086.8

(51) Int. Cl.
*G06F 3/14* (2006.01)
*G06T 3/40* (2006.01)
*B60K 37/02* (2006.01)

(52) U.S. Cl.
CPC ............ *G06F 3/1454* (2013.01); *B60K 37/02* (2013.01); *G06F 3/1438* (2013.01);
(Continued)

(58) Field of Classification Search
CPC ... G06F 3/1438; G06F 3/1454; G06T 3/4092; B60K 37/02; B60K 2350/352;
(Continued)

(56) References Cited

U.S. PATENT DOCUMENTS 5,101,436 A * 3/1992 DeAguiar ............... G06T 17/00
345/503
2003/0156097 A1 8/2003 Kakihara et al.
(Continued)

FOREIGN PATENT DOCUMENTS

DE         198 42 589      9/1999
DE    10 2007 009 978      9/2008
(Continued)

OTHER PUBLICATIONS

Android Developer "Supporting Multiple Screens" published website as captured by wayback machine on date Oct. 5, 2013, http://web.archive.org/web/20131005183849/https://developer.android.com/guide/practices/screens_support.html.*
(Continued)

*Primary Examiner* — Christopher E Leiby
(74) *Attorney, Agent, or Firm* — Hunton Andrews Kurth LLP

(57) ABSTRACT

A method for displaying a display element on at least one vehicle-side display device of a vehicle includes: transmitting, from the vehicle to a terminal via a data link, information about a size of the vehicle-side display device; providing, by the terminal, data for displaying the display element, as a function of the transmitted information about the size of the display device; and transmitting, from the terminal to the vehicle via the data link, the data for displaying the display element.

8 Claims, 1 Drawing Sheet

(52) U.S. Cl.
CPC ........ *G06T 3/4092* (2013.01); *B60K 2370/52* (2019.05); *G09G 2340/0407* (2013.01); *G09G 2340/145* (2013.01); *G09G 2380/10* (2013.01)

(58) Field of Classification Search
CPC ..... G09G 2340/0407; G09G 2340/145; G09G 2380/10
See application file for complete search history.

(56) References Cited

U.S. PATENT DOCUMENTS

| | | | |
|---|---|---|---|
| 2004/0046772 A1 | 3/2004 | Ouchi et al. | |
| 2005/0117601 A1 | 6/2005 | Anderson et al. | |
| 2009/0209198 A1 | 8/2009 | Chang | |
| 2013/0190978 A1* | 7/2013 | Kato | G01C 21/3664 701/36 |
| 2013/0335401 A1 | 12/2013 | Beckmann | |
| 2014/0359493 A1* | 12/2014 | Hong | G06F 3/1454 715/761 |
| 2015/0002370 A1 | 1/2015 | Fernahl et al. | |

FOREIGN PATENT DOCUMENTS

| | | |
|---|---|---|
| DE | 10 2011 112 445 | 9/2012 |
| DE | 10 2012 005 054 | 9/2013 |
| KR | 10-2011-0082089 A | 7/2011 |
| WO | 2013/048168 | 4/2013 |
| WO | 2013/135815 | 9/2013 |

OTHER PUBLICATIONS

Android Developer "Supporting Multiple Screens" published website as captured by wayback machine on date Oct. 11, 2009, http://web.archive.org/web/20091011120659/https://developerandroid.com/guide/practices/screens_support.html.*

Android Developer "Supporting Multiple Screens" published website as found on Jul. 9, 2017 https://developer.android.com/guide/practices/screens_support.html.*

International Search Report, dated Jan. 14, 2015, issued in corresponding International Application No. PCT/EP2014/071166.

"Chapter 5. Graphics Device Abstraction", Dec. 22, 2000, pp. 1-10, retrieved from the Internet: http://proquest.safaribooksonline.com/0130869856/.

"Module 4: The Graphics Device Interface (GDI), Colors, and Fonts", Apr. 14, 2006, 33 pages, retrieved from the Internet: http://www.tenouk.com/download/pdf/visualcplusmfe4.pdf.

"Supporting Multiple Screens", Oct. 15, 2012, 14 pages, retrieved from the Internet: http://web.archive.org/web/20121015181511/http://developer.android.com/guide/practices/screens_support.html Supporting Multiple Screens, Android Developers, Jun. 19, 2013, Wayback Machine, accessed on Apr. 20, 2018, from https://web.archive.org/web/20130619051016/https://stuff.mit.edu/afs/sipb/project/android/docs/guide/practices/screens_support.html, 17 pages.

Korean Office Action issued in corresponding Application No. 10-2016-7012392, dated Apr. 23, 2018.

* cited by examiner

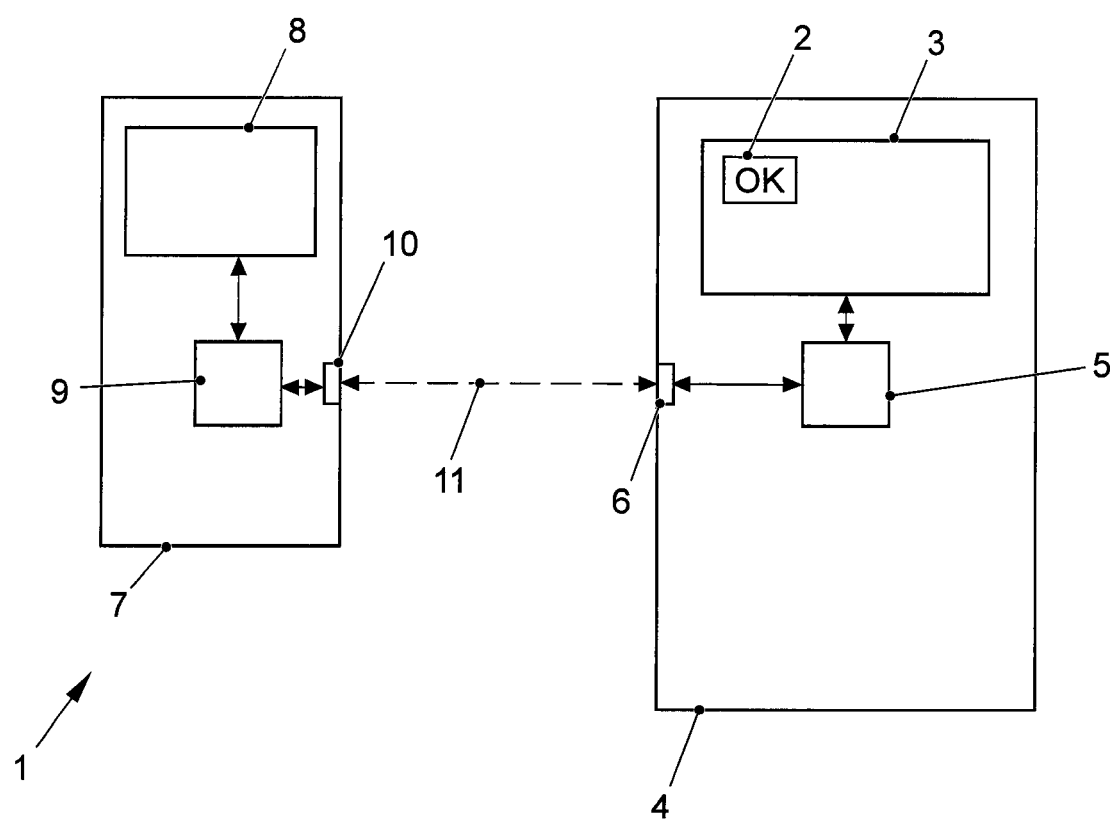

METHOD AND APPARATUS FOR DISPLAYING A DISPLAY ELEMENT

CROSS REFERENCE TO RELATED APPLICATIONS

The present application claims priority to Application No. 10 2013 221 086.8, filed in the Federal Republic of Germany on Oct. 17, 2013, which is expressly incorporated herein in its entirety by reference thereto.

FIELD OF THE INVENTION

The present invention relates to a method and an apparatus for displaying a display element on at least one vehicle-side display device.

BACKGROUND INFORMATION

Display devices for the display of information can be present or installed in vehicles, particularly motor vehicles. For example, such display devices may be part of a vehicle infotainment system, by which information is able to be displayed visually to the driver and possibly other vehicle occupants.

As a rule, control data or control signals for displaying display elements that are intended to be displayed on the vehicle-side display device are made available by at least one vehicle-side control unit, the display device being able to be controlled in accord with the display elements to be shown.

In addition, the use of mobile terminals, e.g., cell phones, so-called tablet computers, portable navigators and other terminals is widely prevalent.

It is also known to transmit data for displaying display elements on a terminal-side display device to the vehicle, and then to display the corresponding display elements on the vehicle-side display device. For instance, an on-screen display of a mobile terminal may be displayed on a screen installed in the vehicle. This is possible with the aid of the familiar MirrorLink technology, for instance.

Published international patent application document WO 2013/048168 A2 describes a method for making a vehicle-side identification service available on what is referred to as a head unit. In this case, the printed publication describes that a head-unit device receives a screen, that is displayed on a second screen of a mobile terminal, via a VNC (virtual network computing) communication, and displays the on-screen display to a user.

Published German patent application document 10 2011 112 445 A1 describes a method for displaying an application in a vehicle, data being made available for displaying an application on a screen. In that case, the printed publication describes that a multifunctional operating device is also able to receive data for displaying an application from a mobile device, e.g., a cell phone. In addition, a control unit and/or the multifunctional operating device is/are able to determine the actual displayed size of the user interface elements as a function of a size of the screen. In this instance, however, the control unit and the multifunctional operating device are located on the vehicle side.

The technical problem is to provide a method and an apparatus for displaying a display element on at least one vehicle-side display device, data for displaying the display element being generated and transmitted in such a way that the display element is able to be displayed uniformly on several display devices, particularly with different sizes.

BRIEF SUMMARY OF THE INVENTION

According to the present invention, a method is proposed for displaying a display element on at least one vehicle-side display device. In this connection, the vehicle-side display device denotes a display device disposed or permanently installed in a vehicle, particularly in a passenger compartment of the vehicle. It may take the form of a display screen, for example, or include such a screen.

A display element here denotes an element that is graphically displayable on the display device, and imparts information visually to an observer. At the same time, the term display element does not preclude that the display element may also take the form of an operator control element or represent such a one. In this context, an operator control element describes an element, upon whose actuation, e.g., via a corresponding input arrangement, at least one predetermined function is triggered or executed. Thus, it is conceivable, for instance, for the vehicle-side display device to take the form of a touchscreen, which permits actuation of operator control elements by touching the touchscreen in the area of the operator control element displayed.

Data for displaying the display element are made available by a terminal. In this regard, the data for the display denote data which encode the graphical representation of the display element. For instance, as a function of these data, a control device is able to control the display device in such a way that the desired display element is displayed on the display device. Data for the display may thus also be referred to as control signals.

In particular, the terminal here denotes a terminal structurally separate from the vehicle. In this case, the terminal-side provision of data means that the data for displaying the display element are generated, for example, by a computing device, e.g., a graphics board, of the terminal. Thereupon, the data for the display may be used unchanged for displaying the display element on the vehicle-side display device. Unchanged here means that the data, which were generated by the terminal, may be used directly and unaltered, e.g., by a corresponding control device, for controlling the vehicle-side display device. In particular, information concerning display size contained or encoded in the data for the display may be used unchanged for controlling the vehicle-side display device.

Furthermore, a data link is produced between the terminal and the vehicle, particularly the vehicle-side display device and/or its control device. Data for displaying the display element are then transmitted from the terminal to the vehicle, especially to the vehicle-side display device. For example, the data for the display are transmitted via corresponding transmitting and receiving devices and possibly corresponding control devices for controlling the vehicle-side display device to the vehicle-side display device or to a control device of the display device. Thus, for example, the data may be transmitted via a terminal-side transmitting device to a vehicle-side receiving device, the data received being transmitted to a control device of the vehicle, and the control device controlling the vehicle-side display device on the basis of, or as a function of, the transmitted data in such a way that the desired display element is displayed.

According to the present invention, information about a size of the vehicle-side display device is transmitted to the terminal. In so doing, the size information may be transmitted from the vehicle to the terminal prior to the transmission of the data for the display. The size here denotes a physical quantity. Thus, for example, a (physical) width and a (physical) height of the vehicle-side display device may be transmitted to the terminal with the aid of the size information. The unit of the physical quantity may be indicated in mm, for instance.

On the terminal side, the data for displaying the display element are provided as a function of the size information transmitted. Consequently, the data for the display are thus generated on the terminal side as a function of the size information transmitted.

In other words, this means that an adjustment of the display element to be displayed, particularly an adjustment of a size or display size of the display element to be displayed, does not take place on the vehicle side, but rather on the terminal side.

The information for the display on the vehicle-side display device is thus rendered or calculated on the terminal side.

This advantageously simplifies a representation of a display element to be displayed, e.g., upon execution of a program carried out on the terminal side, on the vehicle-side display device. Namely, the terminal-side generation of data for the display on the vehicle-side display device advantageously permits a centralized generation of data, the data then already being adapted for display on a corresponding display device different from the terminal.

In an example embodiment, on the terminal side, a predetermined density-independent pixel number is assigned to the display element. In this context, a density-independent pixel number denotes a quantity independent of a dot density of the display device, whereby as a function of the density-independent pixel number, it is possible to ensure that regardless of a size and resolution of different display devices, display elements are able to be displayed on these display devices. For example, a dot-density-independent pixel may be defined as the size of an area of an imaginary pixel, the size of the area itself in turn being able to be defined and used as comparison value.

In this regard, on the terminal side, a density-independent pixel number in the horizontal and/or vertical image direction may be assigned to the display element. The display element with the density-independent pixel number assigned to it may thus also be displayed on a terminal-side display device. Therefore, the density-independent pixel number of the display element may be predefined by, or for, at least one terminal-side application. For example, an application designer is able to develop an application for the terminal. For the display elements needed within the framework of this terminal-side application, the size of display elements to be displayed on the terminal side may be predefined as a function of density-independent pixels. However, one thereby also advantageously determines the physical size with which the display elements are to be displayed on different display devices.

An absolute pixel number of the display element to be displayed on the vehicle-side display device is then determined as a function of the density-independent pixel number and the size information transmitted.

As a result, a display element is advantageously displayed to a user on the vehicle-side display device with the display size familiar to him from the terminal. Thus, with the aid of an easily implementable method, display elements, whose data for the display are made available by a terminal, are advantageously displayed with a desired size on the vehicle-side display device. In particular, during the development, an application designer may already take into account necessary minimum sizes for the display of the display element on a vehicle-side display device and determine the density-independent pixel number accordingly. This is conducive to user-friendly and safe usage during operation of the vehicle. However, for the display of display elements, supplied on the terminal side, on a vehicle-side display device, as a rule, a multitude of factors must be taken into consideration for this minimum size, inter alia, a resolution of the display device of the terminal, a resolution and size of the vehicle-side display device, a size ratio of the display element to the terminal-side display device and an aspect ratio of the terminal-side and vehicle-side display device. The specification of density-independent pixel numbers for a display element thus simplifies the generation of the data for the display.

In one example embodiment, the absolute pixel number is determined as a function of the density-independent pixel number, a reference scaling quantity and a resolution/size ratio.

In this context, the reference scaling quantity denotes a number predefined in a fixed manner for a standard of the density-independent pixels. Thus, for example, for the display of display elements in Android operating systems, it is customary to select the reference scaling quantity equal to 160. Naturally, however, the reference scaling quantity may also assume a different value, depending on the standard. It is essential, however, that the reference scaling quantity be permanently predefined for a terminal or an operating system, and is not changeable.

The resolution/size ratio is a ratio between a resolution of a terminal-side display device and the size of the vehicle-side display device.

For example, the absolute pixel number may be determined according to $$px = (dp/160) dpi\_EF \qquad \text{Equation 1}$$

where px denotes the absolute pixel number, dp the predetermined density-independent pixel number and dpi_EF the resolution/size ratio. In this case, the value 160 is selected as reference scaling quantity.

The resolution/size ratio may be calculated according to $$dpi\_EF = (A\_E/G\_F) \qquad \text{Equation 2}$$

where A_E denotes the resolution of the terminal-side display device and G_F denotes a physical size of the vehicle screen. The resolution/size ratio may also be referred to as the virtual density of the vehicle-side display device.

Advantageously, a simple calculation of the absolute pixel number is thereby obtained for displaying the display element on the vehicle-side display device.

In a further example embodiment, the resolution/size ratio is determined as a ratio between a vertical resolution of the terminal-side display device and the height of the vehicle-side display device. The height here denotes a physical quantity. This determination is carried out in the event a ratio of the width to the height of the terminal-side display device is less than a ratio of the width to the height of the vehicle-side display device. Width and height here denote physical quantities. The vertical resolution may denote a resolution in the vertical image direction.

In another example embodiment, the resolution/size ratio is determined as a ratio between a horizontal resolution of the terminal-side display device and the width of the vehicle-side display device, in the event a ratio of the width to the height of the terminal-side display device is greater than or equal to a ratio of the width to the height of the vehicle-side display device. The horizontal resolution may denote a resolution in the horizontal image direction.

The result is thus that the resolution/size ratio advantageously takes into consideration an aspect ratio between the terminal-side and vehicle-side display device.

In particular, the result of this consideration may be that if the vehicle-side display device is smaller than the terminal-side display device, the display elements displayed on the terminal-side display device are enlarged. All in all, however, the result is that the display elements displayed on the vehicle-side display device are displayed with a desired size. In turn, a display with the desired size in the horizontal and vertical direction desired by the designer is thereby obtained.

In a further example embodiment, the terminal is a mobile terminal, e.g., a portable terminal. For example, the terminal is a cell phone.

Thus, display elements which, for example, are brought to display within the framework of applications on the cell phone, may advantageously be displayed with a desired size on the vehicle-side display device, determination of the absolute pixel number for the display on the vehicle-side display device being simplified.

In another example embodiment, the display element is displayed at the same time on a terminal-side display device. In so doing, the absolute pixel number of the display element displayed on the terminal-side display device may correspond to the absolute pixel number of the display element displayed on the vehicle-side display device. This may possibly lead to the display of the display elements with different sizes on the different display devices. Advantageously, however, only one data set of data must be generated for displaying the display element, namely, the data set that includes data for displaying the display element on the vehicle-side display device. This data set may be used to control both display devices. Since it can be assumed that during a display of display elements by the vehicle-side display device, a driver or other passengers will pay no or only a little attention to the terminal-side display device, it can also be assumed that little irritation will result. However, a computing time and a volume of data generated are advantageously reduced.

In a further example embodiment, the display element is displayed on the terminal-side display device with an absolute pixel number of the display element to be displayed on the vehicle-side display device. This was already explained above.

An apparatus is also proposed for displaying a display element on at least one vehicle-side display device. The apparatus includes at least one terminal and at least one vehicle-side display device. The apparatus may further include a terminal-side display device and control device for controlling the vehicle-side display device, as well as a control device for controlling the terminal-side display device.

Data for displaying the display element are able to be provided by the terminal. In addition, a data link is able to be produced between the terminal and a vehicle. Moreover, data for displaying the display element are transmittable from the terminal to the vehicle.

According to the present invention, information about a size of the vehicle-side display device is transmittable to the terminal, the data for displaying the display element being providable on the terminal side as a function of the size information transmitted.

Advantageously, an apparatus is thereby obtained which permits the implementation of one of the methods previously explained.

In another example embodiment, on the terminal side, a predetermined density-independent pixel number is able to be assigned to the display element, an absolute pixel number of the display element to be displayed on the vehicle-side display device being determinable as a function of the density-independent pixel number and the size information transmitted.

BRIEF DESCRIPTION OF THE DRAWING

FIG. 1 shows a schematic block diagram of an apparatus according to the present invention.

DETAILED DESCRIPTION OF THE INVENTION

FIG. 1 shows schematically a block diagram of an apparatus 1 for displaying a display element 2 on a vehicle-side display device 3. To that end, a vehicle 4 includes vehicle-side display device 3, a vehicle-side control device 5 and a vehicle-side transmitting and receiving device 6

Also shown is a terminal 7. Terminal 7 includes a terminal-side display device 8, a terminal-side control device 9 and a terminal-side transmitting and receiving device 10.

Vehicle-side control device 5 generates signals for controlling vehicle-side display device 3, which lead, among other things, to the display of display element 2.

Correspondingly, terminal-side control device 9 generates signals for controlling terminal-side display device 8.

It is also shown that terminal 7 and vehicle 4 are connected via a wireless link 11 which, for example, may take the form of what is referred to as a MirrorLink connection.

An application designer is able to develop an application, e.g., in the form of a program, for the operating system of terminal 7. In so doing, he is also able to plan a display of display elements to be displayed during the application. For example, by the use of a density-independent pixel number, he is able to encode a size, particularly a display size, of the display elements to be displayed, a predetermined density-independent pixel number, e.g., in the horizontal and vertical image direction, being assigned to a display element. Depending on the resolution of terminal-side display device 8, control device 9 may then determine, as a function of the density-independent pixel number, an absolute pixel number of the display element to be displayed on terminal-side display device 8.

To carry out the method of the present invention, terminal 7 and vehicle 4 may be connected via data link 11. To that end, both terminal-side control device 9 with terminal-side transmitting and receiving device 10, as well as vehicle-side control device 5 with vehicle-side transmitting and receiving device 6 may be connected. Moreover, it may be assumed that terminal-side display device 8 and vehicle-side display device 3 have different resolutions and aspect ratios.

Terminal 7 is able to detect that a vehicle 4 having a vehicle-side display device 3 is connected in terms of data transmission technology to terminal 7. After that, vehicle 4 is able to transmit information concerning a physical size of vehicle-side display device 3, especially concerning a width and a height, to terminal 7. For example, this may be accomplished via a mechanism which is specified in the MirrorLink connection previously explained. This may take place upon request of terminal 7, for instance. The request may be made, for example, if and when the connection of terminal 7 to vehicle 4 is detected.

After receipt of this size information, control device 9 of terminal 7 is able to calculate an absolute pixel number of display element 2 to be displayed on vehicle-side display device 3, as a function of the size, the density-independent pixel number, a reference scaling quantity and a resolution of terminal-side display device 8. Based on this calculated absolute pixel number, data for displaying display element 2 on vehicle-side display device 3 may then be generated by terminal-side control device 9 and transmitted via data link 11 to vehicle 4. As a function of the transmitted data, vehicle-side control device 5 controls display device 3 in such a way that display element 2 is displayed with the absolute pixel number calculated on the terminal side. At the same time, terminal-side control device 9 may also control terminal-side display device 8 in such a way that display element 2 is displayed there with the absolute pixel number adapted to vehicle-side display device 3.

A projection of display element 2 is thus adapted to the size of vehicle-side display device 3, and display element 2 has an appropriate size.

Among other advantages, the present invention advantageously aids an application designer in the development of application graphics elements which are intended to be displayed on the remote display device, i.e., display devices not on the terminal side, and are to be displayed there with a desired size. In this context, the absolute pixel number for the display on such display devices is calculated by terminal 7, particularly an operating system of terminal 7. Preferably, the calculation is not carried out until terminal 7 is connected to a further device which has the display device.

What is claimed is:

1. A method for displaying a display element on at least one vehicle-side display device of a vehicle, the method comprising:
    transmitting, from the vehicle to a terminal via a data link, information about a size of the vehicle-side display device;
    assigning, by the terminal, a predetermined density-independent pixel number to the display element;
    determining, by the terminal, an absolute pixel number of the display element as a function of the density-independent pixel number, a reference scaling quantity, and a resolution/size ratio, wherein the resolution/size ratio is a ratio between a resolution of a terminal-side display device and the size of the vehicle-side display device;
    providing, by the terminal, data for displaying the display element, as a function of the absolute pixel number of the display element; and
    transmitting, from the terminal to the vehicle via the data link, the data for displaying the display element.

2. The method as recited in claim 1, wherein in the event a ratio of the width to the height of the terminal-side display device is less than a ratio of the width to the height of the vehicle-side display device, the resolution/size ratio is determined as a ratio between a vertical resolution of the terminal-side display device and the height of the vehicle-side display device.

3. The method as recited in claim 1, wherein in the event a ratio of the width to the height of the terminal-side display device is no less than a ratio of the width to the height of the vehicle-side display device, the resolution/size ratio is determined as a ratio between a horizontal resolution of the terminal-side display device and the width of the vehicle-side display device.

4. The method as recited in claim 1, wherein the terminal is a mobile terminal.

5. The method as recited in claim 1, wherein the display element is displayed at the same time on a terminal-side display device and on the vehicle-side display device.

6. The method as recited in claim 5, wherein the display element is displayed on the terminal-side display device with the absolute pixel number of the display element to be displayed on the vehicle-side display device.

7. The method of claim 1, wherein the determining of the absolute pixel number is performed upon a detection that the terminal is connected to the vehicle-side display device.

8. A system for displaying a display element, comprising:
    at least one vehicle-side display device of a vehicle, wherein the display element is displayed on the vehicle-side display device; and
    at least one terminal providing data for displaying the display element;
    wherein:
        the terminal is operatively linked to the vehicle via a data link;
        information about a size of the vehicle-side display device is transmitted from the vehicle to the terminal;
        a predetermined density-independent pixel number is assigned by the terminal to the display element;
        an absolute pixel number of the display element is determined by the terminal as a function of the density-independent pixel number, a reference scaling quantity, and a resolution/size ratio, the resolution/size ratio being a ratio between a resolution of a terminal-side display device and the size of the vehicle-side display device;
        the data for displaying the display element are provided by the terminal as a function of the absolute pixel number of the display element; and
        the data for displaying the display element are transmitted from the terminal to the vehicle for displaying the display element.

* * * * *